Sept. 6, 1966  A. A. LACHANCE  3,270,837
AUTOMATIC GROCERY CART
Filed Sept. 9, 1964
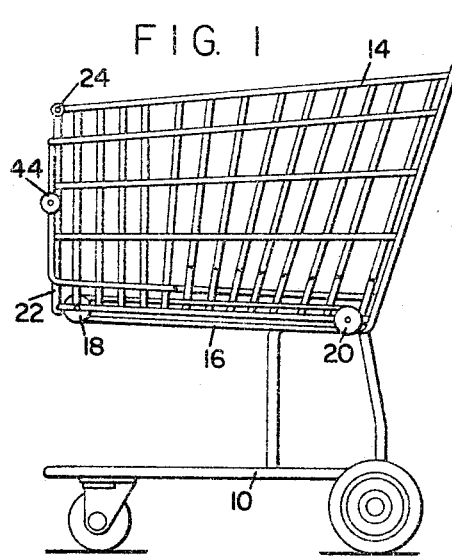
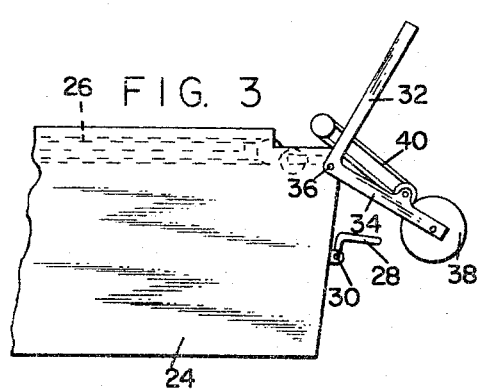
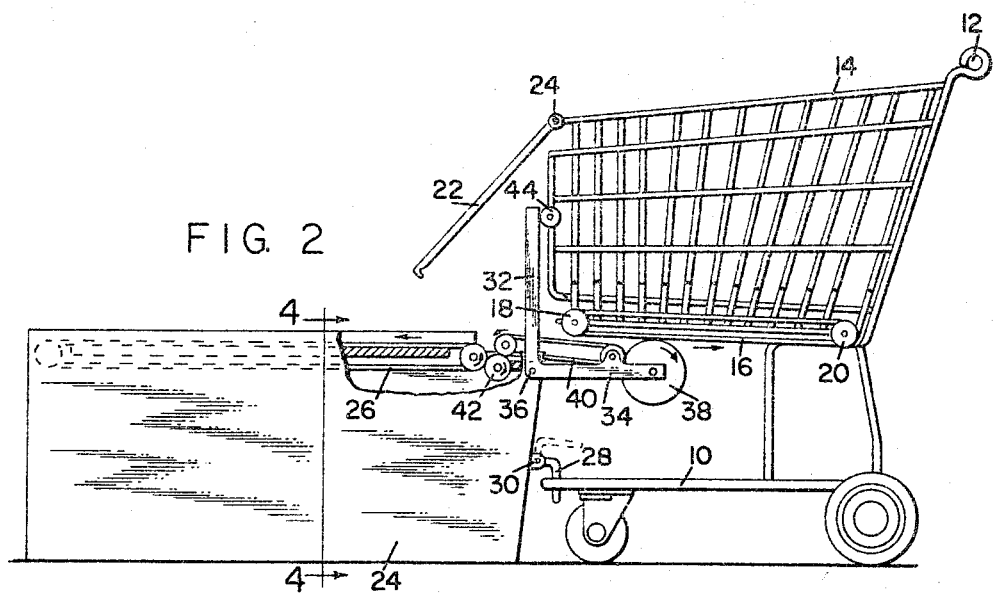
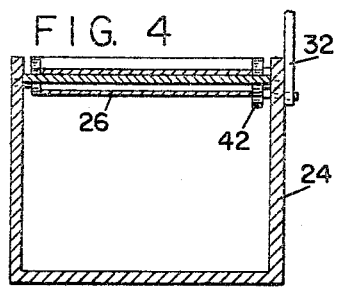
INVENTOR
ARMAND A LACHANCE
BY *Charles R. Fay*
ATTORNEY

United States Patent Office 3,270,837
Patented Sept. 6, 1966

3,270,837
AUTOMATIC GROCERY CART
Armand A. Lachance, % American Metal Products Co., Southbridge St., Auburn, Mass.
Filed Sept. 9, 1964, Ser. No. 395,141
6 Claims. (Cl. 186—1)

This invention relates to an automatic grocery cart and the principal object of the invention resides in the provision of a grocery cart which has an endless conveyor acting as a bottom member for the basket. The cart is not provided with any means to drive the conveyor but the same is adapted to be driven by automatically actuated means located at a checkout counter, and the principal object of the invention resides in the provision of a device located at the checkout counter which is engaged by the forward portion of the carriage as it approaches the checkout counter and swings into operative relationship, a power driven element frictionally contacting and driving the lower run of the endless conveyor in the basket to discharge material from the cart onto the checkout counter.

Another object of the invention resides in the provision of means for maintaining the grocery cart in position at the checkout counter and in the combination therewith of a front opening gate for the basket whereby the merchandise can be discharged forwardly by the belt onto the checkout counter.

Another object of the invention resides in the provision of a pivoted member on the checkout counter having a power operated pulley thereon, said member being in the nature of a bell crank, the pulley being on a horizontal axis at the lower part of the device, so that the cart when pushed into correct operative position, strikes an arm of the bell crank and raises the power operated pulley into operative engagement with respect to the conveyor and immediately starts to actuate the same to discharge the contents of the cart, further in combination with means holding the cart in this position as long as desired either by the operator of the cart or the checkout counter employee so as to complete the discharge of the contents without misalignment of the cart at the checkout counter before the same is empty.

Other objects and advantages of the invention will appear hereinafter.

Reference is to be had to the accompanying drawings, in which:

FIG. 1 is a view in side elevation illustrating the new cart;

FIG. 2 shows the same in operative relation with respect to the checkout counter and driving means;

FIG. 3 illustrates the driving means at the checkout counter in normal condition, and FIG. 4 is a section on line 4—4 of FIG. 2.

The grocery cart of the present invention comprises the conventional under frame 10 which is provided with wheels as shown, a handle 12 and a basket 14. The frame and handle may be conventional but the basket has a bottom which is not made of the usual wire but is an endless belt 16 trained over a roller 18 at the forward portion of the basket and a roller 20 at the rear portion thereof. The front wall of the basket is indicated at 22 and is suspended from a pivot axis 24 at the top portion of the basket so that the gate 22 can be swung forwardly as shown in FIG. 2 to allow the merchandise to exit through this front wall in free and unimpeded condition. Any kind of latch can be utilized to hold the gate closed.

The checkout counter is generally indicated by the reference numeral 24 and it may be provided with an endless conveyor 26. This conveyor 26 is shown as horizontal but it obviously may be made to convey the merchandise upwardly to the left in FIG. 2 on an incline to an elevation which is more conventional and easier for the checkout operator to work at. Such conventional checkout station is not thought necessary to be shown in the present invention.

At the end of the checkout station portion 24 which is shown in FIG. 2, there is provided a hook 28 which is either manually or power operated to drop down into the frame 10 and hold the same in the position shown in FIG. 2. This can be done merely by swinging the hook about a pivot 30 and this can be accomplished either manually by the checkout operator or by a power such as a magnet or the like which can be electrically operated, to assume the solid line position in FIG. 2, or alternatively the dotted line position where it is out of the way and inoperative.

Also mounted adjacent this end of the checkout portion 24 there is a bell crank having the two arms 32 and 34. This bell crank is mounted on a horizontal pivot axis at 36 and in normal and operative condition is as shown in FIG. 3. It has a roll 38 at the free end of arm 34 and this may be driven by an electric motor or in any way desired and as a matter of fact could be energized at the same time the hook 28 is energized if this should be found to be desirable. In any event, the roll 38 is rotated in the direction as shown by the arrow in FIG. 2 and as the cart approaches arm 32 and the bell crank with the front wall 22 previously opened, the arm 32 is moved in a counterclockwise direction to bring arm 34 upwardly and roller 38 in engagement with the belt 16, thus driving it in the direction of the arrow shown in FIG. 2 so that the upper portion or run of the belt moves toward the open end of the grocery cart and discharges the merchandise resting thereon outwardly through the open end onto the checkout counter portion 24 whence it can be taken to the checkout operator.

A subsidiary belt at 40 can also be driven to transfer the material to belt 26, and the motor driven pulley or roll 38 also drives this belt, and if desired, belt 26 also through the intermediary of idler 42. The basket may be provided with a side member 44 to actually engage the member 32 which is located to one side of the transfer belts so as not to impede the goods.

Having thus described my invention and the advantages thereof, I do not wish to be limited to the details herein disclosed, otherwise than as set forth in the claims, but what I claim is:

1. The combination with a checkout counter including a power driven roll, means mounting the driven roll on a movable axis, means attached to said driven roll mounting means to move the latter and thereby the roll from an inoperative position to an operative position; of a grocery cart or the like including a lower wheeled frame, a basket mounted thereon in elevated condition with respect thereto, said basket including an openable forward wall and an endless belt comprising the bottom of the basket, and means on said cart for engaging said second-named means to move it together with the driven roll mounting means to cause the driven roll to move to operative position wherein it engages a run of said belt to drive it in a direction to move articles placed thereon through the forward wall of said basket when open.

2. The combination of claim 1 including releasable means on the counter for engaging the under frame of the carriage and temporarily holding the cart in fixed position with said driving roll in cooperative driving engagement with said belt.

3. In combination, a checkout counter including a power driven roll, a lever mounting said driven roll, means to move said lever from a lower inoperative position to a raised operative position; with a grocery cart which includes a lower wheeled frame and a basket mounted thereon in vertically spaced relation with respect thereto, the forward wall of the basket comprising an openable gate and the floor of the basket comprising an endless belt, wherein the grocery cart may approach the checkout counter with the driven roll entering the space between the lower frame and the cart, said basket including means engaging the means for raising said lever to raise the roll from the lower inoperative position to the upper operative position in engagement with said belt so that the cart itself actuates the lever causing said belt to move in a direction to discharge articles thereon through the forward wall of said basket when opened.

4. The combination of claim 3 including a transfer belt associated with said lever and adapted to transfer articles from the first-named belt to the checkout counter.

5. The combination of claim 3 including a member at said checkout counter adapted to engage the frame of said cart and hold the same in a position wherein the means on the basket holds the lever in its raised operative position.

6. The combination of claim 3 including transfer means on said checkout counter to transfer goods delivered from said first-named endless belt to a position more remote from said basket for the checking operation.

References Cited by the Examiner

UNITED STATES PATENTS

| | | | |
|---|---|---|---|
| 1,217,479 | 2/1917 | Maxwell | 214—44 |
| 1,955,959 | 4/1934 | Harmischfeger. | |
| 2,791,338 | 5/1957 | St. Andre. | |
| 3,036,722 | 5/1962 | Sharaway. | |
| 3,075,659 | 1/1963 | Sylvester | 214—38.20 |
| 3,083,791 | 4/1963 | Shoffner. | |
| 3,115,975 | 12/1963 | Thompson. | |

SAMUEL F. COLEMAN, *Primary Examiner.*